(12) United States Patent
Murase et al.

(10) Patent No.: US 9,342,201 B2
(45) Date of Patent: May 17, 2016

(54) CAPACITIVE TOUCH INPUT DEVICE

(71) Applicants: KABUSHIKI KAISHA TOKAI RIKA DENKI SEISAKUSHO, Aichi (JP); SMK Corporation, Tokyo (JP)

(72) Inventors: Seiya Murase, Aichi (JP); Osamu Yoshikawa, Tokyo (JP)

(73) Assignees: KABUSHIKI KAISHA TOKAI RIKA DENKI SEISAKUSHO, Aichi (JP); SMK Corporation, Tokyo (JP)

(*) Notice: Subject to any disclaimer, the term of this patent is extended or adjusted under 35 U.S.C. 154(b) by 37 days.

(21) Appl. No.: 14/332,395

(22) Filed: Jul. 16, 2014

(65) Prior Publication Data

US 2014/0327652 A1    Nov. 6, 2014

Related U.S. Application Data

(63) Continuation of application No. PCT/JP2012/008063, filed on Dec. 18, 2012.

(30) Foreign Application Priority Data

Jan. 25, 2012    (JP) .................................. 2012-013394

(51) Int. Cl.
G06F 3/044    (2006.01)
G06F 3/041    (2006.01)

(52) U.S. Cl.
CPC .............. G06F 3/044 (2013.01); G06F 3/0416 (2013.01); G06F 2203/04104 (2013.01)

(58) Field of Classification Search
None
See application file for complete search history.

(56) References Cited

U.S. PATENT DOCUMENTS

| 2010/0085324 A1 | 4/2010 | Noguchi et al. |
| 2010/0149110 A1 | 6/2010 | Gray |
| 2010/0283752 A1* | 11/2010 | Maeda ................ G06F 3/044 345/173 |
| 2011/0216039 A1* | 9/2011 | Chen ................ G06F 3/0412 345/174 |

FOREIGN PATENT DOCUMENTS

| JP | H07-129308 A | 5/1995 |
| JP | 2002-041216 A | 2/2002 |
| JP | 2002041216 A * | 2/2002 |
| JP | 2009-258903 A | 11/2009 |

OTHER PUBLICATIONS

International Search Report for International Application No. PCT/JP2012/008063, issued by the Japanese Patent Office on Apr. 2, 2013.

* cited by examiner

*Primary Examiner* — Alexander Eisen
*Assistant Examiner* — Kebede Teshome

(57) ABSTRACT

A capacitive touch input device capable of detecting two or more different input positions and detecting each input position within a short period of time is provided. One of two or more drive electrodes respectively belonging to drive electrode group DV(n) and a drive electrode group DV(n') adjacent to each other is a common drive electrode arranged therebetween. A pitch between the drive electrodes arranged at equal intervals is set so that a change in a detection voltage level R(m,n) appears at a detection electrode S(m) arranged in the vicinity of an input operator when a drive control unit performs drive control of the drive electrode group DV(n) and the input operator is at a position distant from the drive electrode group DV(n) up to an intermediate position of the adjacent drive electrode group DV(n').

4 Claims, 6 Drawing Sheets

FIG.3

| | P1<br>D1 | P2<br>D2 | P3<br>D3 | P4<br>D4 | P5<br>D5 | P6<br>D6 | P7<br>D7 | P8<br>D8 | P9<br>D9 | P10<br>D10 | P11<br>D11 | P12<br>D12 | P13<br>D13 |
|---|---|---|---|---|---|---|---|---|---|---|---|---|---|
| DV(1) | ON | ON | ON | OFF | OFF | OFF | OFF | OFF | OFF | OFF | OFF | OFF | OFF |
| DV(2) | OFF | OFF | ON | ON | ON | OFF | OFF | OFF | OFF | OFF | OFF | OFF | OFF |
| DV(3) | OFF | OFF | OFF | OFF | ON | ON | ON | OFF | OFF | OFF | OFF | OFF | OFF |
| DV(4) | OFF | OFF | OFF | OFF | OFF | OFF | ON | ON | ON | OFF | OFF | OFF | OFF |
| DV(5) | OFF | OFF | OFF | OFF | OFF | OFF | OFF | OFF | ON | ON | ON | OFF | OFF |
| DV(6) | OFF | OFF | OFF | OFF | OFF | OFF | OFF | OFF | OFF | OFF | ON | ON | ON |

CAPACITIVE TOUCH INPUT DEVICE

CROSS REFERENCE TO RELATED APPLICATION

The contents of the following Japanese and PCT patent applications are incorporated herein by reference,
NO. 2012-013394 filed on Jan. 25, 2012, and
NO. PCT/JP2012/008063 filed on Dec. 18, 2012.

FIELD

The present invention relates to a capacitive touch input device such as a capacitive touch panel or a capacitive touch pad that detects an input position on the basis of the arrangement position of a detection electrode whose capacitance with an input operator will be increased as a result of the approach of the input operator on an insulation panel. More particularly, the present invention relates to a capacitive touch input device that detects an input position according to a cross-point method with which a capacitance change caused by the approach of an input operator is detected for each intersection between a drive electrode with a detection voltage applied thereto and a detection electrode intersecting with the drive electrode.

BACKGROUND

Input detection methods in a capacitive touch input device that detects an input position inputted by an input operator such as a finger are classified into a self-capacitance method (single-line method) and a mutual capacitance method (two-line method). According to the self-capacitance method, a detection electrode whose stray capacitance has been increased as a result of the approach of an input operator is detected and the input position is detected on the basis of the arrangement position of the detection electrode. According to the mutual capacitance method, a detection voltage at a predetermined voltage level is applied to drive electrodes. Then, a detection electrode whose detection voltage level has been decreased as a result of the approach of an input operator is detected, and the input position is detected on the basis of the arrangement position of the detection electrode. The former method has a simple configuration due to the absence of the wiring of drive electrodes. In the former method, however, the stray capacitance to be detected is at a very small level from 10 to 20 pF, i.e., the level difficult to be detected. Thus, the latter mutual capacitance method is generally employed.

The mutual capacitance method is further classified into a projective method and a cross-point method. According to the projective method, a plurality of X-direction electrodes and a plurality of Y-direction electrodes are arranged on an insulation panel so as to be insulated from each other. A detection operation using one of the X-direction electrodes and the Y-direction electrodes as drive electrodes to which a detection voltage is applied and using the other one of those electrodes as detection electrodes for detecting detection voltage levels and a detection operation using the other as drive electrodes and the one as detection electrodes are performed in an alternate manner. Based on the position of the detection electrode whose detection voltage level has been decreased, the input position in the X and Y directions is detected. According to the cross-point method, a plurality of drive electrodes to which a detection voltage is applied and a plurality of detection electrodes for detecting detection voltage levels are arranged so as to be perpendicular to each other. From among intersections between the drive electrodes and the detection electrodes, the input position is detected on the basis of the intersection of the detection electrode whose detection voltage level has been decreased. According to the projective method, a detection voltage is applied simultaneously to all of the plurality of drive electrodes which are one of the X-direction electrodes and the Y-direction electrodes. The detection electrode whose detection voltage level has been decreased is detected from among all of the detection electrodes which are the other one of the X-direction electrodes and the Y-direction electrodes. Thus, the input position can be detected within a short period of time. However, when input operations are simultaneously made on two different input positions on an input operation surface, virtual images determined as two input positions are additionally generated in the X and Y directions of the two input positions. Thus, the input positions cannot be detected for the case of the simultaneous input operations made on two or more points in the projective method.

According to the cross-point method, on the other hand, a detection voltage level obtained as a result of the approach of an input operator is detected for all of the intersections. Thus, even if input operations are simultaneously made on two or more different positions, each such an input position can be detected. However, the detection of the input positions takes long since a detection voltage is applied for each of pluralities of drive electrodes and detection voltage levels are detected for all of the detection electrodes intersecting with that drive electrode group with the detection voltage applied thereto. In a capacitive touch panel with an enlarged input operation surface, in particular, the number of intersections to be detected is proportionally increased. Thus, reduction in the response speed of an input operation becomes apparent.

In view of the above, according to the related capacitive touch panel that detects an input position with the cross-point method, capacitive touch panels such as Patent Literatures 1 and 2 have been proposed. According to the capacitive touch panel in Patent Literature 1, interlaced drive scanning is performed in which part of drive electrodes with a detection voltage applied thereto is skipped. Upon the detection of an input operation, drive scanning is performed in detail for all of the drive electrodes in the vicinity of the input position. According to the capacitive touch panel in Patent Literature 2, a plurality of drive electrodes adjacent to each other in the drive scanning direction are bundled and a detection voltage is applied to each bundled drive electrode group.

FIG. 6 is an explanatory diagram for illustrating a method for detecting an input position in a capacitive touch panel 100 disclosed in Patent Literature 2. According to the capacitive touch panel 100, from among a plurality of drive electrodes Dn (n is a natural number greater than or equal to 1) arranged in a direction perpendicular to the plane of paper in the figure, two drive electrodes $D2n-1$ and $D2n$ adjacent to each other in a drive scanning direction (the horizontal direction in the figure) are grouped together as a drive electrode group. An AC drive voltage is then applied to each drive electrode group DV(n). Each of graphs (a), (b) and (c) of FIG. 6 shows a relationship, when the drive voltage is applied to the drive electrode group DV(n), between an input position of an input operator along the drive scanning direction and a detection voltage level R(m,n) appearing at a detection electrode S(m) arranged along the drive scanning direction in the vicinity of the input position with the polarity of the detection voltage level R(m,n) inverted.

As is apparent from FIG. 6, when the input operator comes close to the vicinity of the drive electrode group DV(n) with the drive voltage applied thereto, the capacitance between the drive electrode with the drive voltage applied thereto and the input operator is increased. Part of the drive voltage signal is flown into the input operator and the detection voltage level $R(m,n)$, which detects the drive voltage, is decreased (increased in FIG. 6 due to the inverted polarity) in the detection electrode capacitively-coupled with the drive electrode at a certain capacitance. When the input operator is positioned at a place distant from the drive electrode group $DV(n)$ with the drive voltage applied thereto, on the other hand, the capacitance between the drive electrode with the drive voltage applied thereto and the input operator is decreased to a negligibly small level in comparison to the capacitance between that drive electrode and the detection electrode. Thus, the detection voltage level $R(m,n)$ detected in the detection electrode does not change.

Thus, based on the detection voltage levels $R(m,n)$ appearing at the detection electrode $S(m)$ when the drive voltage is applied to the drive electrode groups $DV(n)$, the input position of the input operator can be detected. For example, assuming that the input position is at $y_0$ in the figure along the drive scanning direction, when the drive voltage is applied to the drive electrode groups $DV(n)$ (n is from 1 to 3), the detection voltage levels $R(m,n)$ detected from the detection electrode $S(m)$ are $a_0$, $b_0$, and $c_0$, respectively, in accordance with the respective amounts of change. The detection voltage level $R(m,n)$ gets smaller at a greater distance from the wiring position of the drive electrode group $DV(n)$ with the drive voltage applied thereto. Thus, the input position $y_0$ between the wiring positions of the drive electrode group $DV(1)$ and the drive electrode group $DV(2)$ is obtained from the ratio between $a_0$ and $b_0$.

In this manner, according to the related capacitive touch input devices described in Patent Literatures 1 and 2, the number of drive voltage applications is smaller than the number of detection electrodes actually wired. Thus, an amount of time taken for detecting an input position can be shortened.

CITATION LIST

Patent Literature

Patent Literature 1: Japanese Patent Application Laid-Open No. H7-129308
Patent Literature 2: Japanese Patent Application Laid-Open No. 2009-258903

SUMMARY

Technical Problem

According to the above-described capacitive touch input device disclosed in Patent Literature 1, if another input operation is made on another position while detailed drive scanning is performed about a particular input position, such another input position cannot be detected. If input operations are made simultaneously on two or more input positions, it is required to perform interlaced scanning first and then perform detailed drive scanning repeatedly for each of the input positions. Thus, an amount of time taken for detecting the input positions cannot be shortened sufficiently.

According to the capacitive touch input device described in Patent Literature 2, the detection voltage is applied simultaneously to the plurality of drive electrodes together making up the drive electrode group $DV(n)$. Thus, as shown in FIG. 6, the amount of change in the detection voltage level $R(m,n)$ appearing at the detection electrode $S(m)$ has an approximately constant value irrespective of where is the input position between the drive electrodes with the drive voltage applied thereto. Thus, the input position cannot be accurately detected between the drive electrodes. The detection voltage level $R(m,n)$ draws a line symmetrically about the central position of the drive electrode group $DV(n)$ with the central position being a peak thereof. Thus, particularly when the input positions are $y_1$ and $y_2$ equally distant from the central position of the drive electrode group $DV(n)$, the amounts of change in the detection voltage level $R(m,n)$, i.e., $(a_1,b_1,c_1)$ and $(a_2,b_2,c_2)$, are equal to each other. Thus, whether the input position is $y_1$ or $y_2$ cannot be determined.

Therefore, if the input position is located between the drive electrodes with the drive voltage applied thereto, the input position needs to be detected again by applying the drive voltage to each of the drive electrodes together making up the drive electrode group $DV(n)$. Thus, as with the invention described in Patent Literature 1, an amount of time taken for detecting the input position cannot be shortened sufficiently.

The present invention has been made in view of the aforementioned problems of the related techniques. It is an object of the present invention to provide a capacitive touch input device capable of detecting two or more different input positions and detecting each input position within a short period of time.

Solution to Problem

In order to achieve the aforementioned object, a capacitive touch input device according to a first aspect of the present invention includes: a plurality of drive electrodes arranged on an insulation panel in a first direction at equal intervals therebetween; a plurality of detection electrodes $S(m)$ arranged on the insulation panel in a second direction perpendicular to the first direction, the plurality of detection electrodes $S(m)$ intersecting with all of the plurality of drive electrodes with an insulative interval therebetween; a detection voltage generation circuit for generating an AC detection voltage; a drive control unit for setting a plurality of drive electrode groups $DV(n)$, each consisting of two or more drive electrodes adjacent to each other in the second direction, along the second direction so that each of the drive electrodes belongs to at least one of the drive electrode groups $DV(n)$ and executing drive control of applying the detection voltage in a synchronized manner to the drive electrodes belonging to the drive electrode group $DV(n)$ for all of the drive electrode groups $DV(n)$; and capacitance detection means for detecting a detection voltage level $R(m,n)$ appearing at the detection electrode $S(m)$ intersecting with the drive electrode group $DV(n)$ in accordance with a capacitance change between the drive electrode group $DV(n)$ and an input operator upon the drive control of the drive electrode group $DV(n)$ by the drive control unit. For every drive control for all of the drive electrode groups $DV(n)$, an input position of the input operator in the first direction and the second direction on the insulation panel is detected on the basis of the detection voltage levels $R(m,n)$ detected from all of the detection electrodes $S(m)$ by the capacitance detection means. One of the two or more drive electrodes belonging to each of the drive electrode group $DV(n)$ and the drive electrode group $DV(n')$ adjacent to each other in the second direction is a common drive electrode arranged therebetween. A pitch between the drive electrodes arranged in the second direction at equal intervals is set so that upon the drive control of the drive electrode group $DV(n)$ by the drive control unit, a change in the detection voltage level $R(m,n)$ appears at the detection electrode $S(m)$ arranged in the vicinity of the input operator at least at a position where the input operator is distant from the drive electrode group DV(n) up to an intermediate position of the drive electrode group DV(n') adjacent to the drive electrode group DV(n) in the second direction.

At any input position along the second direction, the detection electrode S(m) shows a change in the detection voltage level R(m,n) and a change in the detection voltage level R(m,n') upon the drive control of the drive electrode group DV(n) and the drive electrode group DV(n') adjacent to each other in the second direction. Thus, any input position along the second direction can be detected on the basis of the amounts of change in the detection voltage level R(m,n) and the detection voltage level R(m,n') and the wiring positions of the drive electrode group DV(n) and the drive electrode group DV(n') along the second direction.

The number n of the drive electrode groups DV(n) to be drive-controlled with the application of the drive voltage is smaller than the number of the drive electrodes arranged on the insulation panel. Thus, the number of intersections with the detection electrodes S(m) for detecting the detection voltage levels R(m,n) can be reduced. An amount of time taken for detecting an input position can be therefore shortened.

In the capacitive touch input device according to a second aspect of the present invention, drive control of the plurality of drive electrode groups DV(n) set along the second direction is performed in the order different from the second direction.

Irrespective of the drive control order of the drive electrode groups DV(n), the input position is detected on the basis of the detection voltage levels R(m,n) detected at the respective intersections with the detection electrodes S(m) within one scanning period for performing the drive control of all of the drive electrode groups DV(n).

In the capacitive touch input device according to a third aspect of the present invention, the drive control unit is configured by a microcomputer having a plurality of input and output ports corresponding to the plurality of drive electrodes. The input and output ports of the microcomputer corresponding to the drive electrodes are connected to voltage output lines connecting the detection voltage generation circuit with the drive electrodes, respectively. The microcomputer switches the input and output ports between an OFF mode for setting the input and output port as an output port and an ON mode for setting the input and output port as an input port or in a high impedance state and performs switching control between applying the detection voltage to the drive electrode connected to the input and output port and stopping the application thereof.

When the input and output port is in the output port mode, the potential of the drive electrode connected to that input and output port is stabilized at the potential of the output port. Thus, no AC detection voltage is applied thereto. When the input and output port is in the input port mode or in the high impedance state, no current flows from the detection voltage generation circuit to the input and output port. Thus, the AC detection voltage is applied to the drive electrode.

According to the first aspect of the present invention, the input position is detected on the basis of the capacitance changes at the intersections between the drive electrode groups DV(n) and the detection electrodes S(m). Thus, even if input operations are made on two or more different positions on the insulation panel, each of the input positions can be detected. Also, since the input position is detected by performing drive control for each of the drive electrode groups DV(n) in the number smaller than the number of the drive electrodes arranged on the insulation panel, all of the input positions can be detected within a short period of time.

According to the second aspect of the present invention, the drive control of the plurality of drive electrode groups DV(n) set along the second direction can be performed in any order. Thus, the drive control order can be adjusted in order to eliminate the influence of common mode noise periodically generated by the surrounding commercial AC source or the interlaced drive control of the drive electrode groups DV(n) can be performed according to an input operation speed.

According to the third aspect of the present invention, with the simple configuration for switching the input and output port modes of the microcomputer, the number of the drive electrodes together making up the drive electrode group on the insulation panel can be changed or the drive order of the drive electrode groups can be changed according to the input position or input operation speed. Thus, the input position can be detected more accurately and quickly.

BRIEF DESCRIPTION OF DRAWINGS

FIG. 3 is a state chart showing mode states in an input and output port P of a microcomputer 4 for performing drive control of the drive electrode groups DV(n).

DESCRIPTION OF EMBODIMENTS

Figure 1:
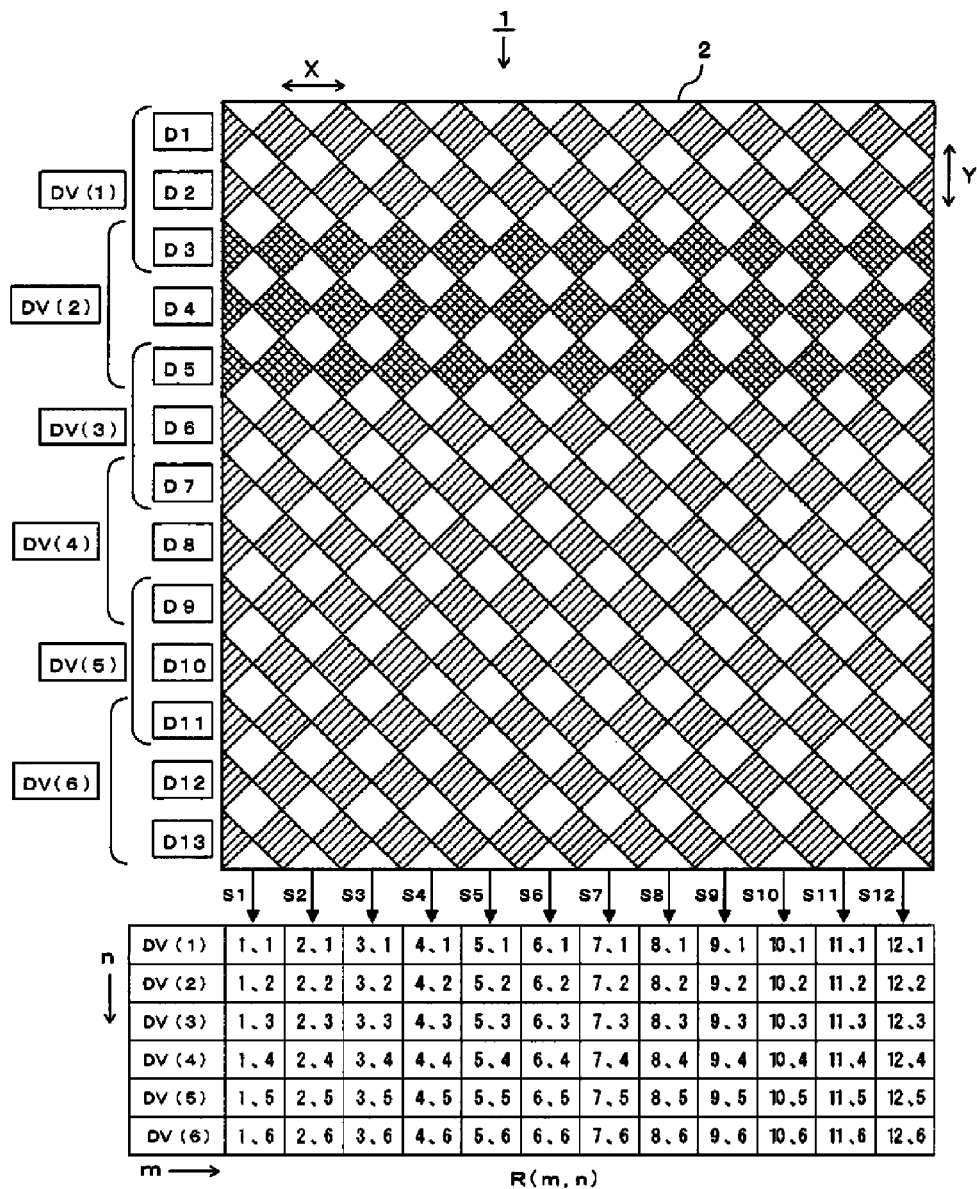
FIG. 1 is an explanatory diagram for illustrating a relationship between drive electrode groups DV(n) and detection voltage levels R(m,n) appearing at detection electrode S(m) in a capacitive touch panel 1 according to an embodiment of the present invention.

A capacitive touch panel (hereinafter referred to as a touch panel) 1 according to an embodiment of the present invention will now be described below with reference to FIGS. 1 to 5. As shown in FIG. 1, the touch panel 1 includes: 13 drive electrodes D1 to D13 each having a pattern of diamond shapes continuously arranged along an X direction; and 12 detection electrodes S1 to S12 each having a pattern of diamond shapes continuously arranged along a Y direction. The drive electrodes D1 to D13 and the detection electrodes S1 to S12 are arranged on an insulation panel 2 so as to be insulated from each other. The 13 drive electrodes D1 to D13 are arranged at equal pitches in the Y direction. The 12 detection electrodes S1 to S12 are arranged at equal pitches in the X direction. The pattern of diamond shapes for one of the electrodes fills up interspaces generated by the pattern of diamond shapes for the other one of the electrodes, thereby forming a staggered pattern as a whole.

The front surface side of the drive electrodes D1 to D13 and the detection electrodes S1 to S12 arranged on the insulation panel 2 in a lattice pattern is covered by a transparent insulation sheet (not shown) in order to protect these electrodes and to prevent an input operator such as a finger from directly touching these electrodes to cause malfunction. Specifically, the touch panel 1 according to the present embodiment detects an input position as follows. An input operator touches or comes close to the transparent insulation sheet to perform an input operation. Then, an increase in capacitance between the drive electrode D and the input operator, caused by the approach of the input operator via the transparent insulation sheet, is read from a detection voltage level R(m,n) appearing at the detection electrode S(m) in the vicinity of the input operator to detect the input position. Based on this detection principle, the pitch of the drive electrodes D1 to D13 is set so that even if an input operation is made on any position on the insulation panel 2, the input position can be detected. The detail thereof will be described later.

Figure 2:
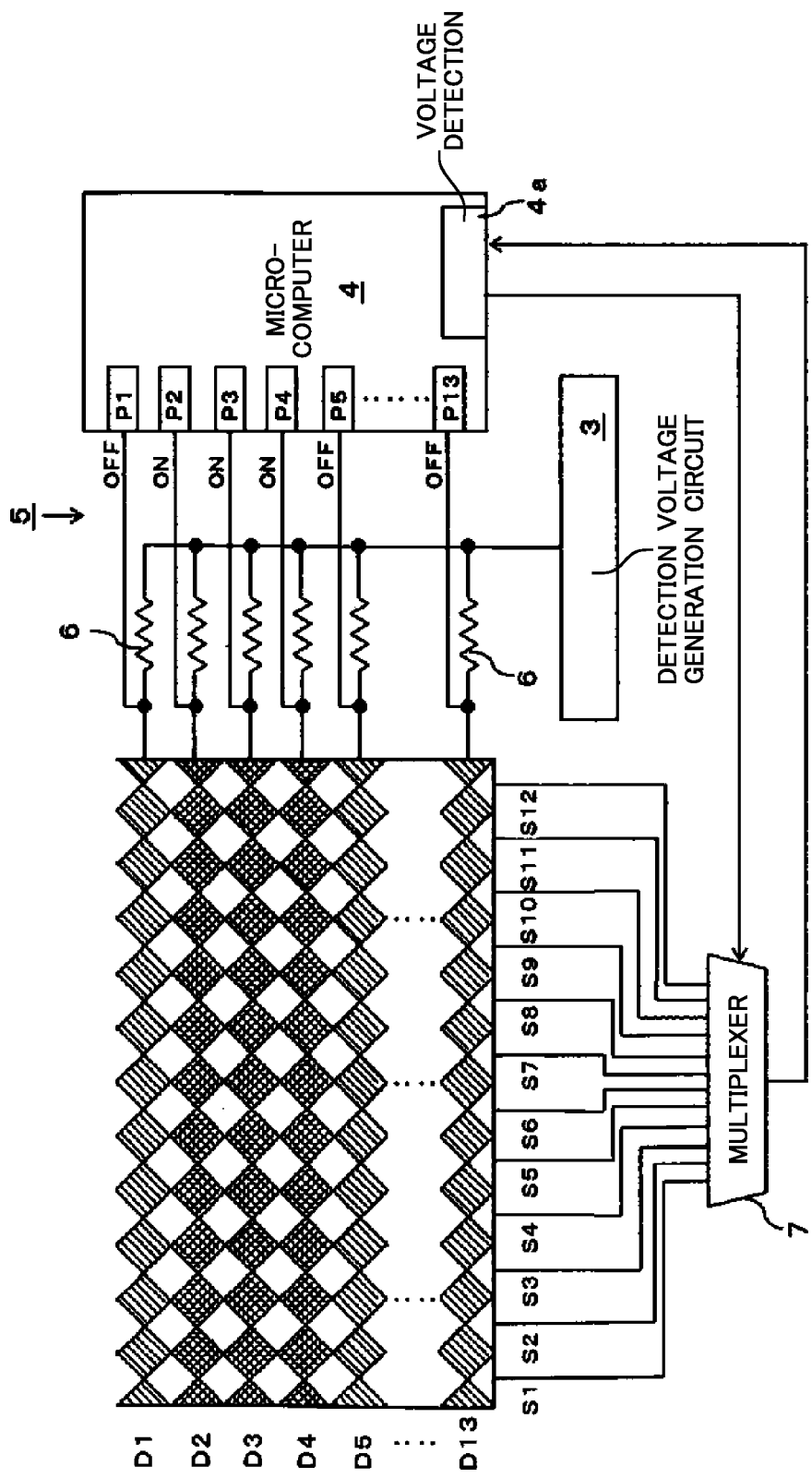
FIG. 2 is a circuit diagram of a drive control unit 5.

As shown in FIG. 2, each of the drive electrodes D1 to D13 is connected to a detection voltage generation circuit 3 via a damping resistor 6 for removing noise. The detection voltage generation circuit 3 outputs a detection voltage with a pulse height Vo in the form of a rectangular wave AC signal. Input and output ports P1 to P13 of a microcomputer 4 are connected to connection points between the drive electrodes D1 to D13 and the damping resistors 6 so as to correspond to the drive electrodes D1 to D13.

When the input and output port P is in an OFF mode for setting this input and output port P as an output port, the potential of the drive electrode (D1, D5, or D13 in FIG. 2) connected to this input and output port is stabilized at the potential of the output port (for example, 0V if at the "L" level and $V_{cc}$, if at the "H" level). Thus, the detection voltage of the rectangular wave AC signal outputted from the detection voltage generation circuit 3 is not applied to the drive electrode D (D1, D5, or D13 in FIG. 2) connected to this input and output port P. When the input and output port P is in an ON mode for setting this input and output port P as an input port, on the other hand, this input port P is in a high impedance state. Thus, the rectangular wave AC signal outputted from the detection voltage generation circuit 3 does not flow into the input and output port P (P2, P3, or P4 in FIG. 2) and the detection voltage by the rectangular wave AC signal is applied to the drive electrode D (D2, D3, or D4 in FIG. 2) connected to this input and output port P. In other words, only by setting any one or more input and output ports P as output port(s) or input port(s) in any order, the microcomputer 4 can control the application of the detection voltage to the drive electrode(s) D connected to such input and output port(s) P.

According to the present embodiment, three drive electrodes D adjacent to one another in the Y direction are grouped into a drive electrode group DV(n) as shown in FIG. 1. The drive electrode group DV(n) and the drive electrode group DV(n') adjacent to each other in the Y direction overlap in the drive electrode D disposed therebetween. This overlapped drive electrode D is a constituent element for both of the drive electrode groups DV(n) and DV(n'). In this manner, 6 kinds of drive electrode groups DV(n) (n is an integer from 1 to 6) are set out of the 13 drive electrodes D arranged on the insulation panel 2.

As shown in FIG. 3, in the order of the drive electrode groups DV(n) along the Y direction, the microcomputer 4 sets the input and output ports P corresponding to the drive electrode group DV(n) in the ON mode. Consequently, the synchronized rectangular wave AC signal is outputted to the three drive electrodes D together making up this drive electrode group DV(n) and the drive voltage with the pulse height of Vo is applied thereto. In this manner, the drive voltage can be applied to all of the drive electrodes D arranged on the insulation panel 2 only by 6 drive control operations for applying the drive voltage to each drive electrode group DV(n).

The 12 detection electrodes S(m) (m is an integer from 1 to 12) are connected to a multiplexer 7 that switches the connection with a voltage detection circuit 4a of the microcomputer 4 under the control of the microcomputer 4. The microcomputer 4 sequentially switches the connection to the 12 detection electrodes S(m) for each drive control period of each drive electrode group DV(n). The microcomputer 4 connects such connection-switched detection electrode S(m) to the voltage detection circuit 4a of the microcomputer 4.

By applying the drive voltage to the three drive electrodes D in the drive electrode group DV(n), the voltage detection circuit 4a reads a pulse height (input voltage Vi) of the rectangular wave AC signal appearing at the detection electrode S(m) through a capacitance $C_0$ between the drive electrode group DV(n) and the detection electrode S(m) intersecting with the group DV(n). This capacitance $C_0$ is an approximately constant value. Thus, if no input operator approaches and no change therefore occurs in the stray capacitance of the drive electrode group DV(n), the input voltage Vi does not change at a constant voltage Vc proportional to the drive voltage Vo. On the other hand, when the input operator approaches the drive-controlled drive electrode group DV(n) or the detection electrode S(m), the capacitance between the drive electrode group DV(n) or the detection electrode S(m) and the input operator is increased, part of the rectangular wave AC signal is flown into the input operator, and the input voltage Vi appearing at the detection electrode S(m) is decreased. As a distance between the input operator and the drive electrode group DV(n) or the detection electrode S(m) is reduced, the input voltage Vi is further decreased from the constant voltage Vc. In order for the microcomputer 4 to calculate the input position from this potential difference, the voltage detection circuit 4a represents the read input voltage Vi as a detection voltage level R(m,n) by inverting and binarizing the potential difference between the read input voltage Vi and the constant voltage Vc.

The microcomputer 4 performs the drive control of the respective drive electrode groups DV(n) and the switching control of the connections to the intersecting detection electrodes S(m) for each drive-controlled drive electrode group DV(n). Thus, during such one scanning period, the detection voltage levels R(m,n) in n rows by m columns are obtained from the voltage detection circuit 4a as shown in FIG. 1. Herein, the detection voltage level R(m,n) represents an amount of potential change appearing at the detection electrode S(m) that intersects with the drive electrode group DV(n) being drive-controlled. Thus, if the input operator approaches an intersection between the drive electrode group DV(n) and the detection electrode S(m), the detection voltage level R(m,n) is increased. Therefore, the microcomputer 4 compares the detection voltage levels R(m,n) in n rows by m columns one another and detects the vicinity of the intersection at which a local maximum is detected as the input position.

Figure 4:
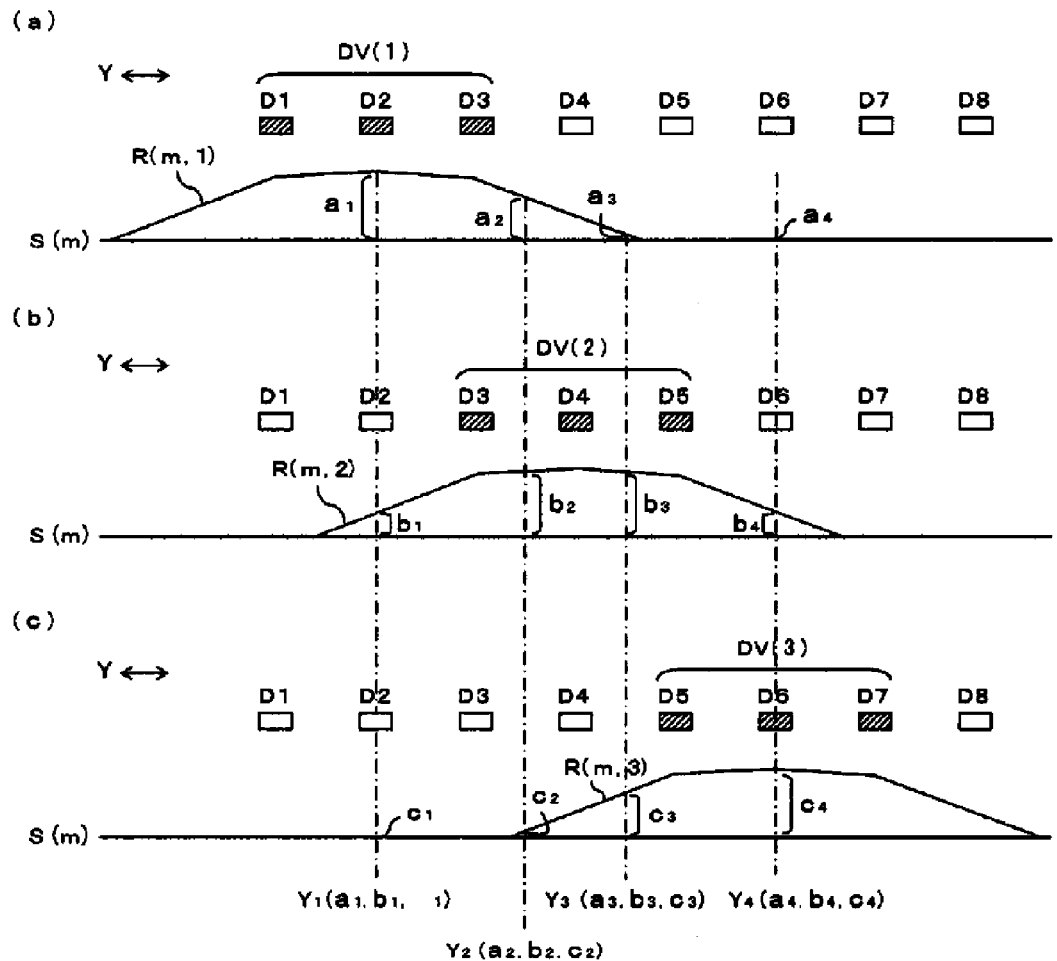
FIG. 4 is respective waveform chart showing: (a) a relationship between a drive electrode group DV(1) with a drive voltage applied thereto and a detection voltage level R(m,1) appearing at the detection electrode S(m); (b) a relationship between a drive electrode group DV(2) with the drive voltage applied thereto and a detection voltage level R(m,2) appearing at the detection electrode S(m); and (c) a relationship between a drive electrode group DV(3) with the drive voltage applied thereto and a detection voltage level R(m,3) appearing at the detection electrode S(m).

FIG. 4 is waveform chart showing a relationship between the detection voltage level R(m,n) detected from the detection electrode S(m) and an input position in the Y direction (position on the detection electrode S(m) in the Y direction) wherein the wiring position of the detection electrode S(m) is defined as an input position in the X direction and the drive control of the drive electrode groups DV(1), DV(2), and DV(3) is performed. As shown in graph (b) of FIG. 4, when the drive control of the drive electrode group DV(2) is performed, the detection voltage level R(m,2) is highest when the input position is at the center of the drive electrode group DV(2) (the wiring position of the drive electrode D4). The detection voltage level R(m,2) remains at high values when the input position is between the drive electrodes D3 and D5 making up the drive electrode group DV(2). As described above, as the input position is further away from the drive-controlled drive electrode group DV(2), the detection voltage level R(m,2) is further decreased. Nevertheless, the distance from the drive electrode group DV(2) to the intermediate position ($Y_1$) or ($Y_4$) of the drive electrode group DV(1) or DV(3) adjacent to the drive electrode group DV(2), i.e., the pitch between the drive electrodes D in the Y direction, is set so that the detection voltage level R(m,2) can be detected as a certain value ($b_1$) or ($b_4$) even when the input position is distant from the drive electrode group DV(2) at least up to the intermediate position ($Y_1$) or ($Y_4$). Here, the input position refers to the position of the input operator in the Y direction when the input operator touches or comes close to the transparent insulation sheet. Therefore, if the input operator is in proximity to the transparent insulation sheet above the intermediate position ($Y_1$) or ($Y_4$), the detection voltage level R(m,2) is at least detected as the certain value ($b_1$) or ($b_4$).

The drive electrodes D1 to D13 have the identical shapes and are arranged at equal pitches. Thus, even when the drive electrode group DV(1) is being drive-controlled and the input position is at the intermediate position of the drive electrode group DV(2) adjacent to the drive electrode group DV(1) (i.e., the wiring position of the drive electrode D4), the detection voltage level R(m,1) is detected as a certain value. Similarly, even when the drive electrode group DV(3) is being drive-controlled and the input position is at the intermediate position of the drive electrode group DV(2) adjacent to the drive electrode group DV(3) (i.e., the wiring position of the drive electrode D4), the detection voltage level R(m,3) is detected as a certain value. Accordingly, even when the input position (position on the detection electrode S(m) in the Y direction) is at any place in the Y direction, the detection voltage levels R(m,n) and R(m,n') detected upon the drive control of at least two kinds of drive electrode groups DV(n) and DV(n') adjacent to each other near the input position have certain values excluding 0. Based on such values, any input position in the Y direction can be detected.

For example, in FIG. 4, when the input position is at $Y_1$, the detection voltage level R(m,1) is $a_1$ indicating that the input position is in the drive electrode group DV(1) and the detection voltage level R(m,2) is $b_1$, which is decreased as the input position is further away from the drive electrode group DV(2). Therefore, the input position $Y_1$ in the drive electrode group DV(1) is detected.

Similarly, even for the input positions $Y_2$ and $Y_3$ in the drive electrode group DV(2), the detection voltage level R(m,1) when the input position is at $Y_2$ is $a_2$, which is decreased as the input position is further away from the drive electrode group DV(1), and the detection voltage level R(m,3) when the input position is at $Y_3$ is $C_3$, which is decreased as the input position is further away from the drive electrode group DV(3). Therefore, the input positions $Y_2$ and $Y_3$ in the drive electrode group DV(2) can be accurately detected.

Figure 5:
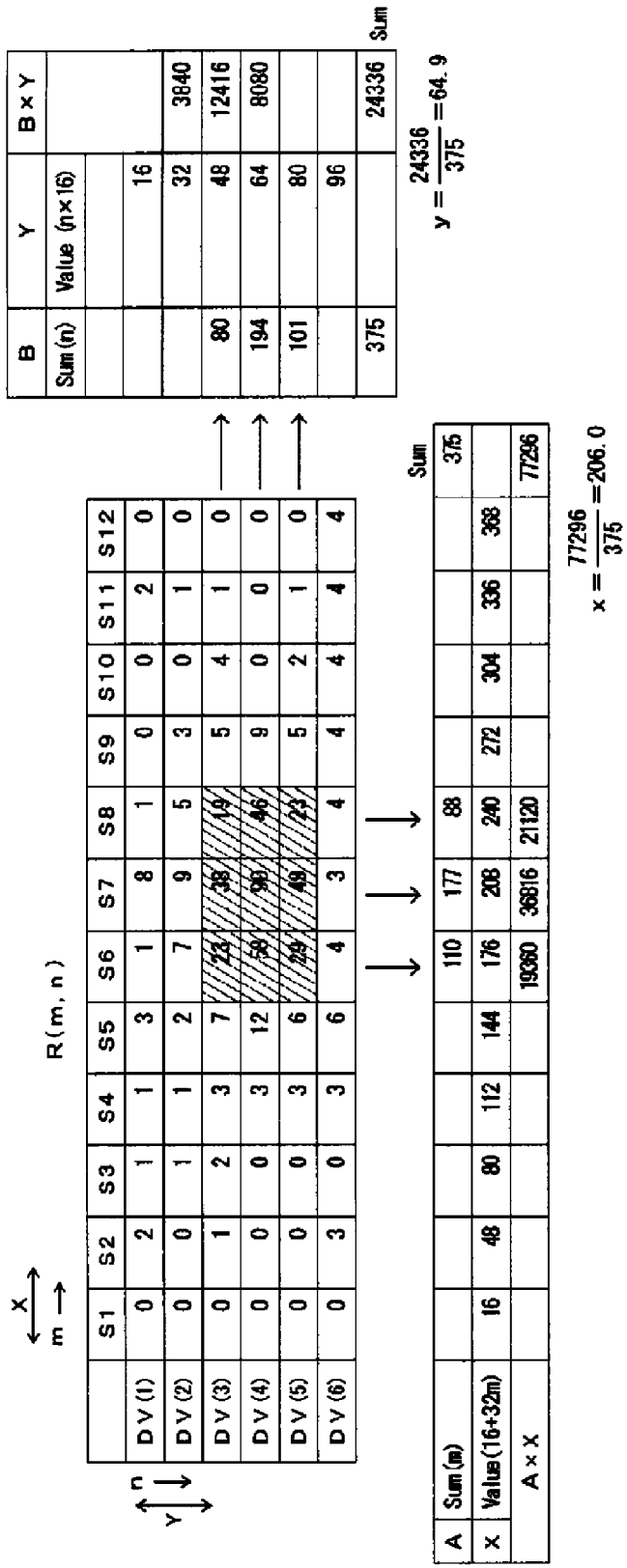
FIG. 5 is an explanatory diagram for illustrating a method for detecting an input position from the detection voltage levels R(m,n).
Figure 6:
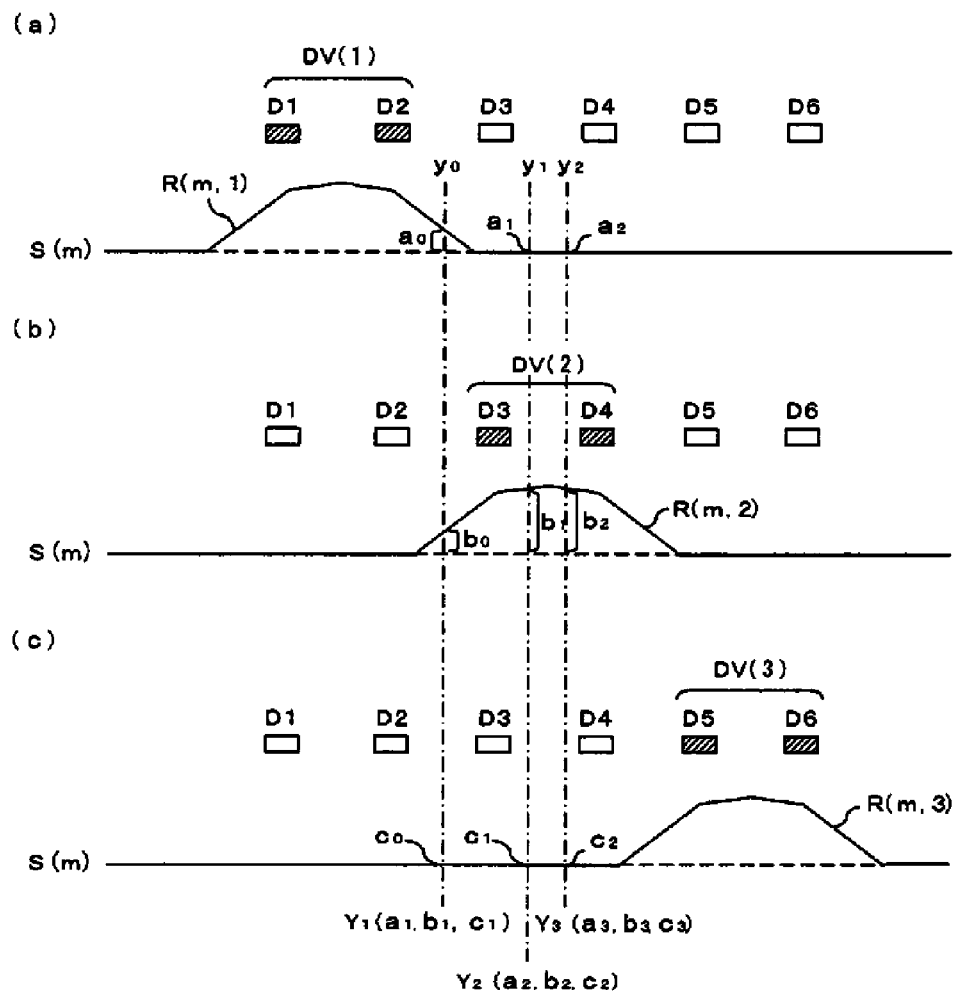
FIG. 6 is waveform chart showing: (a) a relationship between a drive electrode group DV(1) with a drive voltage applied thereto and a detection voltage level R(m,1) appearing at a detection electrode S(m) in a related capacitive touch panel 100; (b) a relationship between a drive electrode group DV(2) with the drive voltage applied thereto and a detection voltage level R(m,2) appearing at the detection electrode S(m); and (c) a relationship between a drive electrode group DV(3) with the drive voltage applied thereto and a detection voltage level R(m,3) appearing at the detection electrode S(m).

An example of detecting an input position of an input operator by means of the above-described touch panel 1 will now be described. It is assumed that the detection voltage levels R(m,n) in 6 rows by 12 columns are detected as shown in FIG. 5 on the basis of the input voltages Vi read from the 12 detection electrodes S(m) while the 6 kinds of drive electrode groups DV(n) are drive-controlled. Here, the detection voltage level R(m,n) binarized by the voltage detection circuit 4a is expressed in a decimal value for ease of explanation.

At an intersection (m,n) distant from the input position at which the capacitance with the input operator is negligibly small, the input voltage Vi read from the detection electrode S(m) is the constant voltage Vc. Thus, the detection voltage level R(m,n) at this intersection (m,n) is "0." On the other hand, the detection voltage level R(m,n) at the intersection (m,n) in the vicinity of the input position has a maximum value in comparison with the surrounding thereof. Thus, the vicinity of the intersection (m,n) at which the local maximum is detected in the X direction and the Y direction in FIG. 5 is assumed to be the input position. The detection voltage levels R(m,n) at the surrounding intersections adjacent to such an intersection (m,n) are set as valid data used for the detection of the input position.

Irrespective of the input operator, however, the detection voltage level R(m,n) may have a certain value due to common mode noise, a detection error, or the like. Thus, in order to discriminate such a case from a change in the input voltage Vi caused by an input operation, when the detection voltage level R(m,n) has a local maximum smaller than a specified threshold value (smaller than "20" in FIG. 5), such a detection voltage level R(m,n) is ignored. The following detection of the input position is therefore not performed. When a plurality of local maximums greater than the threshold value are detected, it is assumed that input operations are made simultaneously in the vicinity of such intersections. Then, the detection of the input position for each of the intersections is repeatedly performed.

Among the local maximums in FIG. 5, the local maximum exceeding the predetermined threshold value is "90" only at the intersection (7,4) between the detection electrode S(7) and the drive electrode group DV(4). Thus, it is assumed that the input operation was made on one place in the vicinity of the intersection (7,4). The detection voltage levels R(6-8, 3-5) surrounding the intersection (7,4) are used as the valid data (shown with hatched lines in FIG. 5).

The detection of an input position x in the X direction is obtained from a weighted average value of the valid data in the X direction. Specifically, each of the wiring positions of the 12 detection electrodes S(m) on the insulation panel 2 is weighted with "16" assigned to the initial value and "32" assigned to the pitch in the X direction. The reason why the weighting of the detection electrode S(1) is set at "16" is that the influence of an input operator is received only from one side in the X direction. Subsequently, the valid data is added in the Y direction for each of the detection electrodes S(6-8) to obtain Sum(6)="110," Sum(7)="177," and Sum(8)="88" and the summation thereof is calculated to obtain "375." Thereafter, each of the total values Sum(6-8) for the detection electrodes S(6-8) is multiplied by the weighted value assigned to the wiring position of the corresponding one of the detection electrodes S(6-8). The summation thereof is calculated to obtain "77296." The input position in the X direction obtained from the weighted average is "77296"/"375"=206.1. Thus, the position of 206.1 weighted in the X direction (between the detection electrode S(6) and the detection electrode S(7)) is detected as the input position.

Similarly, the detection of an input position y in the Y direction is obtained from a weighted average value of the valid data in the Y direction. Weighting on positions in the Y direction is performed in such a manner that "16" is assigned to an interspace between adjacent two of the 6 kinds of drive electrode groups DV(n) and raised by "16" is made for every intermediate position of the drive electrode group DV(n). Subsequently, the valid data is added in the X direction for each of the drive electrode groups DV(3-5) to obtain Sum(3)="80," Sum(4)="194," and Sum(5)="101" and the summation thereof is calculated to obtain "375." Thereafter, each of the total values Sum(3-5) for the drive electrode groups DV(3-5) is multiplied by the weighted value assigned to the intermediate position of the corresponding one of the drive electrode groups DV(3-5) in the Y direction. The summation thereof is calculated to obtain "24336." The input position in the Y direction obtained from weighted average is "24336"/"375"=64.9. Thus, the position of 64.9 weighted in the Y direction (between the drive electrode group DV(4) and the drive electrode group DV(5)) is detected as the input position.

According to the present embodiment, the drive voltage can be applied to all of the 13 drive electrodes D arranged on the insulation panel 2 only by performing the drive control of the 6 kinds of drive electrode groups DV(n). An input position between the drive electrodes D can be detected with the number of control operations smaller than or equal to that for applying the drive voltage to the drive electrodes D with at least two drive electrodes D bundled as one.

In the above-described embodiment, the drive control is performed in the order of the drive electrode groups DV(n) arranged along the Y direction. However, connections between each drive electrode group DV(n) being drive-controlled and the detection electrodes S(m) can be controlled in any order by the microcomputer 4.

Moreover, according to the above-described touch panel 1, the input position is detected on the basis of the detection voltage levels R(m,n) in 6 rows by 12 columns detected during one drive scan for performing drive control of the 6 kinds of drive electrode groups DV(n). However, the input position can be detected by repeating a plurality of drive scans and using the plurality of detection voltage levels R(m,n) obtained about each intersection (m,n).

For example, instead of performing drive control in the order of the drive electrode groups DV(n), the drive control may be performed for each drive scan. The average value of the detection voltage levels R(m,n) detected for each drive scan may be used as the detection voltage level R(m,n) about the intersection (m,n). In this manner, the influence of common mode noise periodically generated from the detection voltage level R(m,n) for detecting the input position may be eliminated.

In the above-described embodiment, the input and output port P of the microcomputer 4 is described as the input and output port P capable of switching its modes between the output port and the input port. However, the input and output port P may be what is called a tri-state port further including a high impedance mode, for example. In this case, the similar function can be achieved by employing the high impedance mode in place of the mode setting the input and output port P as the input port.

In the above-described embodiment, the detection voltage generation circuit 3 is described as a generation circuit for outputting the rectangular wave AC signal. However, the AC signal is not limited to the rectangular wave. For example, AC signals in other forms such as a sine wave may be used.

INDUSTRIAL APPLICABILITY

The present invention is suitable for a capacitive touch input device that detects an input position with the cross-point method.

REFERENCE SIGNS LIST

1 capacitive touch panel
2 insulation panel
3 detection voltage generation circuit
4 microcomputer
4*a* voltage detection circuit (capacitance detection means)
5 drive control unit
D drive electrode
DV(n) drive electrode group
S(m) detection electrode
P input and output port

The invention claimed is:
1. A capacitive touch input device comprising:
a plurality of drive electrodes arranged on an insulation panel in a first direction at equal intervals therebetween;
a plurality of detection electrodes S(m) arranged on the insulation panel in a second direction perpendicular to the first direction, the plurality of detection electrodes S(m) intersecting with all of the plurality of drive electrodes with an insulative interval therebetween;
a detection voltage generation circuit for generating an AC detection voltage;
a drive control circuit for setting a plurality of drive electrode groups DV(n), each consisting of two or more drive electrodes adjacent to each other in the second direction, along the second direction so that each of the drive electrodes belongs to at least one of the drive electrode groups DV(n) and executing drive control of applying the detection voltage in a synchronized manner to the drive electrodes belonging to the drive electrode group DV(n) for all of the drive electrode groups DV(n); and
a capacitance detection circuit for detecting a detection voltage level R(m,n) appearing at the detection electrode S(m) intersecting with the drive electrode group DV(n) in accordance with a capacitance change between the drive electrode group DV(n) and an input operator upon the drive control of the drive electrode group DV(n) by the drive control unit, the capacitive touch input device detecting, for every drive control for all of the drive electrode groups DV(n), an input position of the input operator in the first direction and the second direction on the insulation panel on the basis of the detection voltage levels R(m,n) detected from all of the detection electrodes S(m) by the capacitance detection circuit, wherein
one of the two or more drive electrodes belonging to each of the drive electrode group DV(n) and the drive electrode group DV(n') adjacent to each other in the second direction is a common drive electrode arranged therebetween;
a pitch between the drive electrodes arranged in the second direction at equal intervals is set so that upon the drive control of the drive electrode group DV(n) by the drive control circuit, a change in the detection voltage level R(m,n) appears at the detection electrode S(m) arranged in the vicinity of the input operator at least at a position where the input operator is distant from the drive electrode group DV(n) up to a center position of the drive electrode group DV(n') adjacent to the drive electrode group DV(n) in the second direction, and the center position of the drive electrode group DV(n') adjacent to the drive electrode group DV(n) in the second direction does not belong to the drive electrode group DV(n).

2. The capacitive touch input device according to claim 1, wherein drive control of the plurality of drive electrode groups DV(n) set along the second direction is performed in an order different from the second direction.

3. The capacitive touch input device according to claim 1, wherein the drive control circuit includes a microcomputer having a plurality of input and output ports corresponding to the plurality of drive electrodes, the input and output ports of the microcomputer corresponding to the drive electrodes are connected to voltage output lines connecting the detection voltage generation circuit with the drive electrodes, respectively, and the microcomputer switches the input and output ports between an OFF mode for setting the input and output port as an output port and an ON mode for setting the input and output port as an input port or in a high impedance state and performs switching control between applying the detection voltage to the drive electrode connected to the input and output port and stopping the application thereof.

4. The capacitive touch input device according to claim 1, wherein only one of the two or more drive electrodes belonging to each of the drive electrode group DV(n) and the drive electrode group DV(n') adjacent to each other in the second direction is the common drive electrode arranged therebetween.

* * * * *